Figure 5:
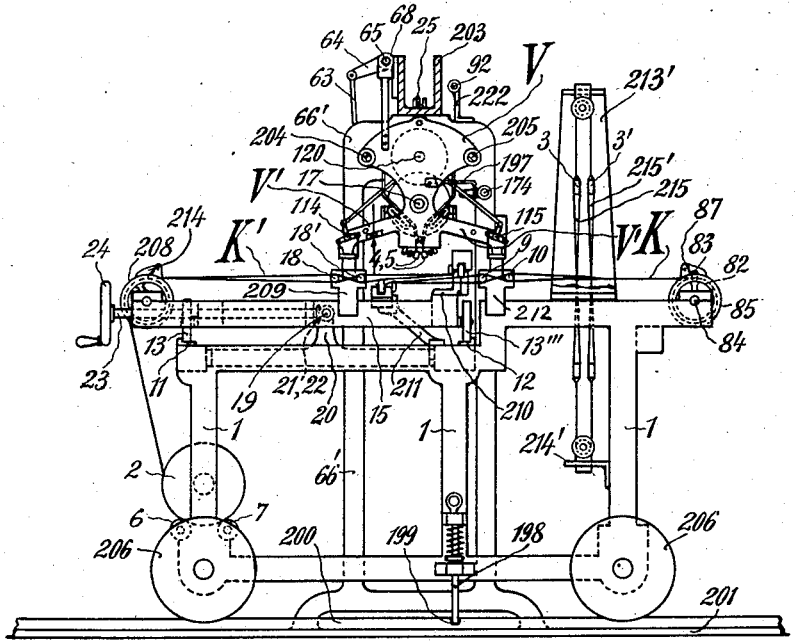

A. SCHUSTER.
WARP TWISTING-IN MACHINE.
APPLICATION FILED NOV. 1, 1910.
1,027,670.
Patented May 28, 1912.
11 SHEETS—SHEET 1.
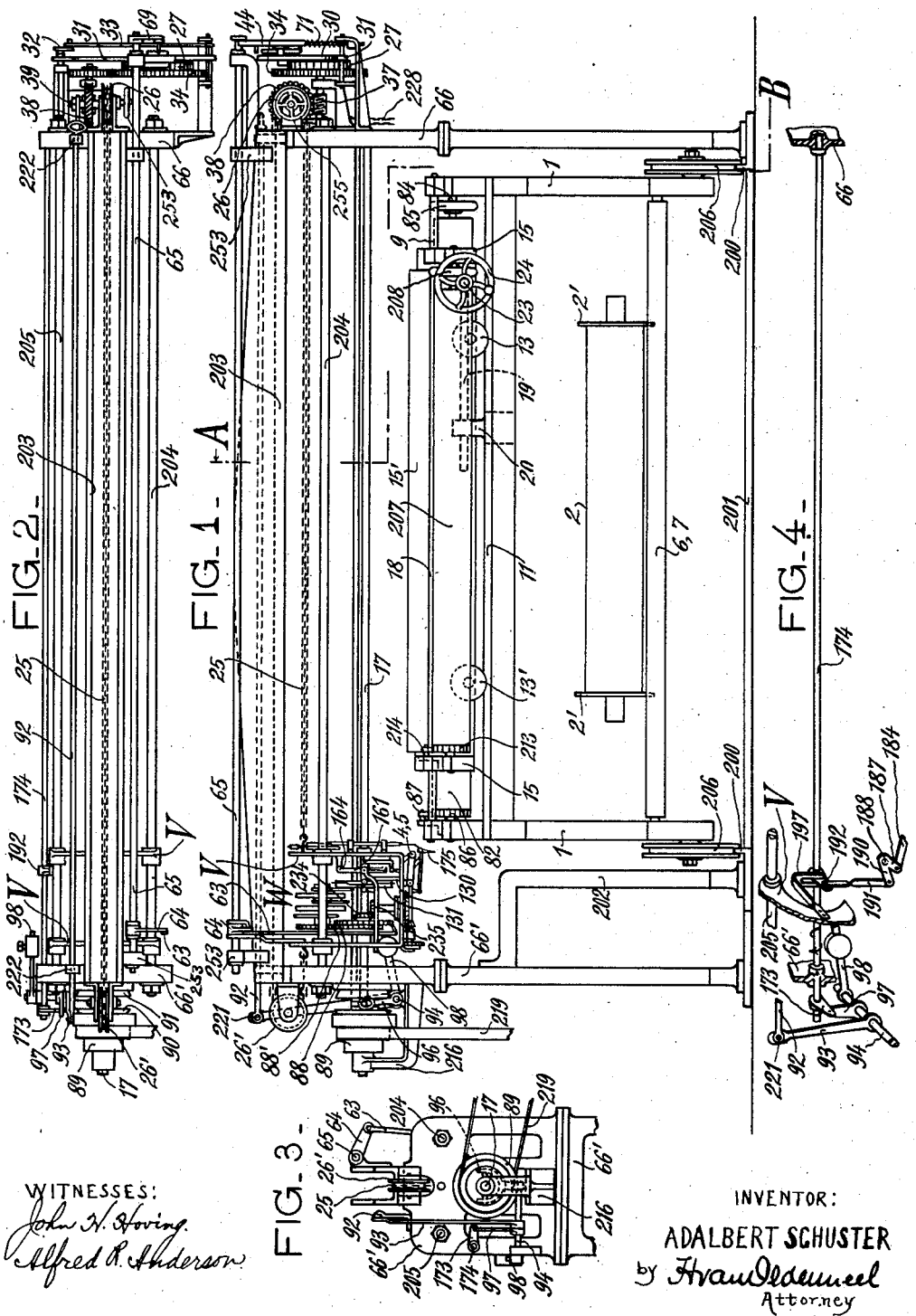
WITNESSES:
John N. Hoving.
Alfred R. Anderson
INVENTOR:
ADALBERT SCHUSTER
by H. van Oldenneel
Attorney

A. SCHUSTER.
WARP TWISTING-IN MACHINE.
APPLICATION FILED NOV. 1, 1910.

1,027,670.

Patented May 28, 1912.
11 SHEETS—SHEET 2.

WITNESSES:
John H. Hoving.
Alfred P. Anderson.

INVENTOR:
ADALBERT SCHUSTER
by H. van Oldeneel
Attorney

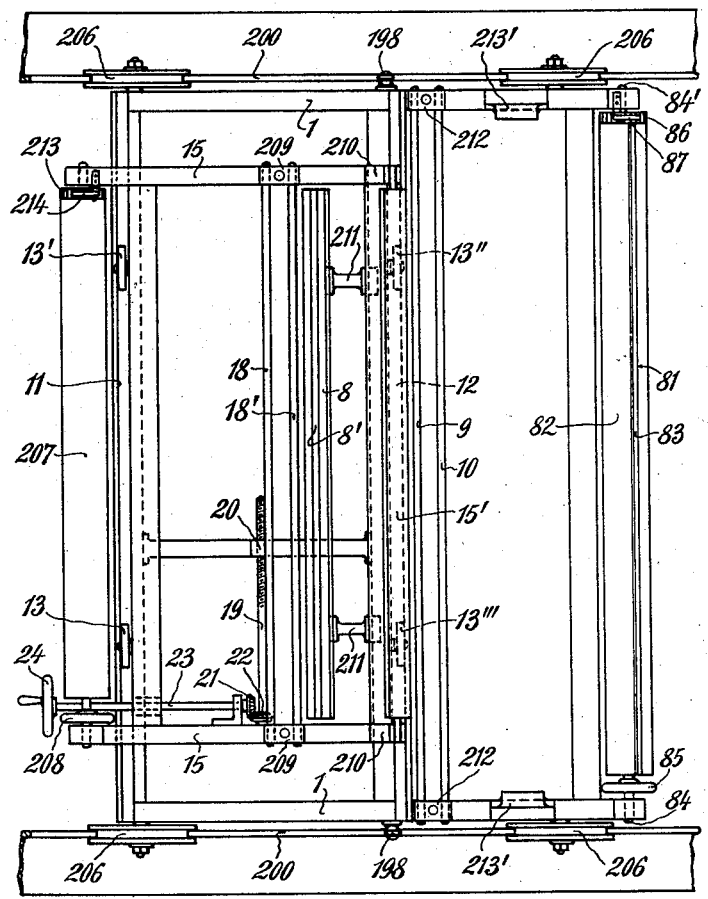

A. SCHUSTER.
WARP TWISTING-IN MACHINE.
APPLICATION FILED NOV. 1, 1910.
1,027,670.
Patented May 28, 1912.
11 SHEETS—SHEET 4.
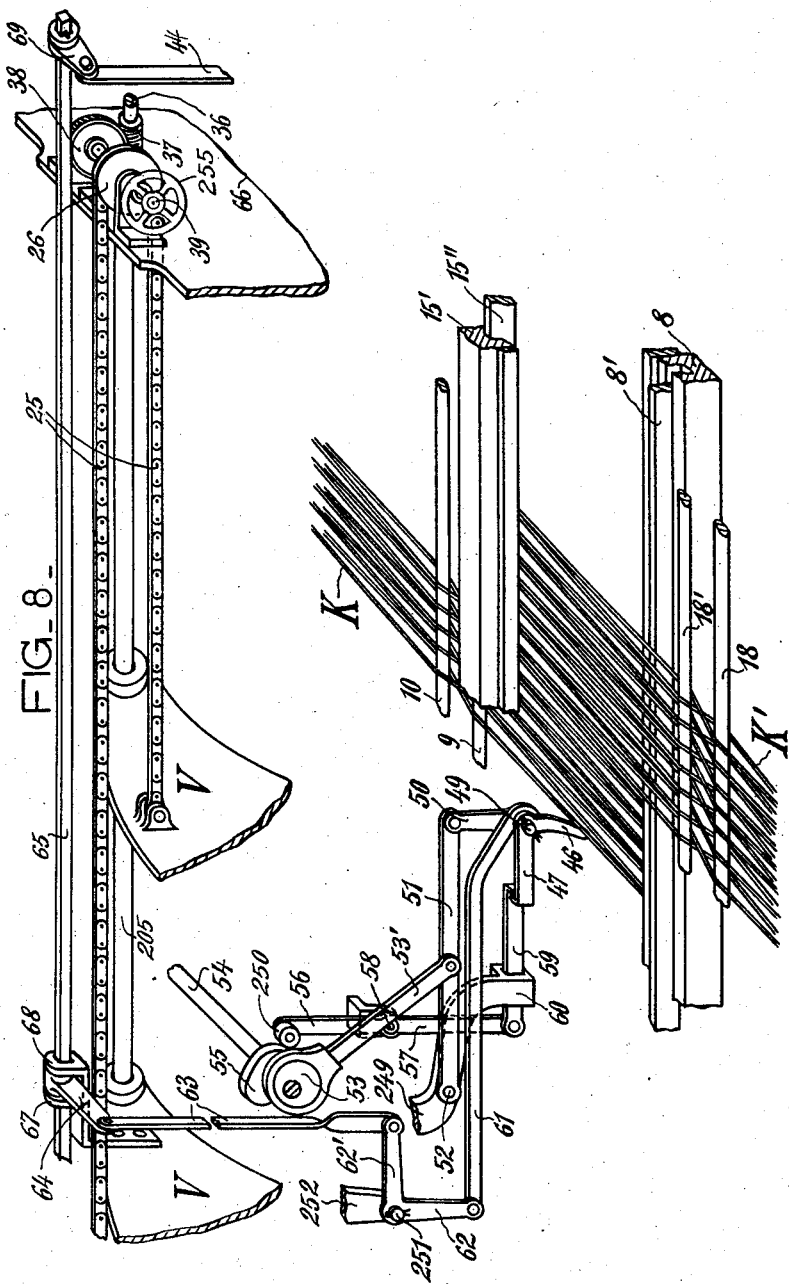
WITNESSES:
John H. Hoving
Alfred R. Anderson
INVENTOR:
ADALBERT SCHUSTER
by H. van Oldemmel
Attorney A. SCHUSTER.
WARP TWISTING-IN MACHINE.
APPLICATION FILED NOV. 1, 1910.
1,027,670.
Patented May 28, 1912.
11 SHEETS—SHEET 5.
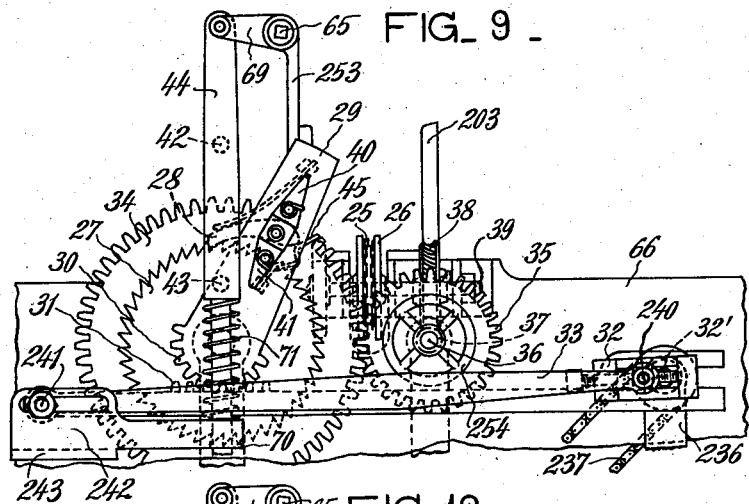
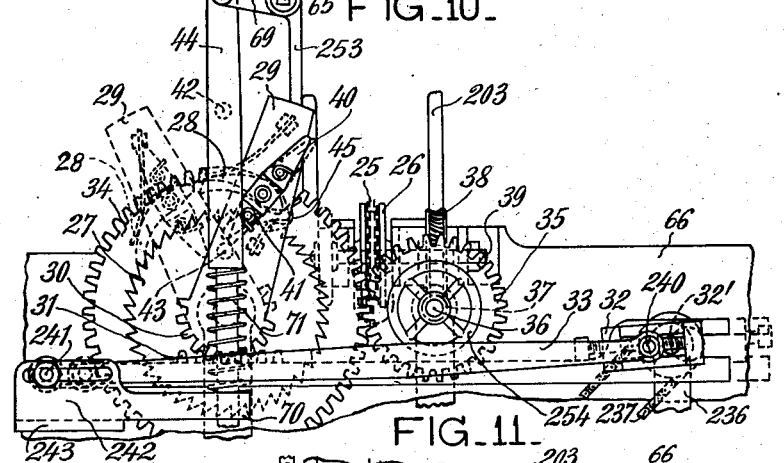
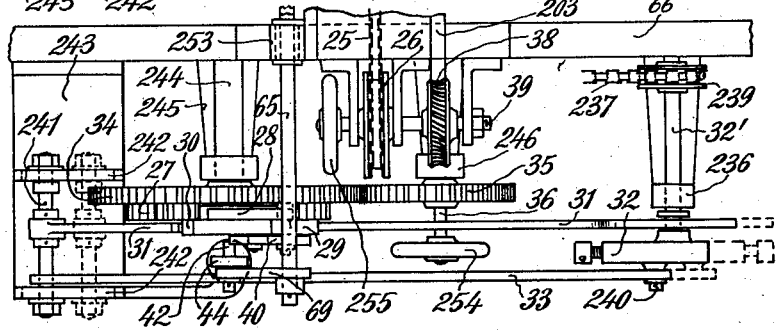
WITNESSES:
John H. Hoving.
Alfred R. Anderson.
INVENTOR:
ADALBERT SCHUSTER
by H. van Deventer
Attorney A. SCHUSTER.
WARP TWISTING-IN MACHINE.
APPLICATION FILED NOV. 1, 1910.
1,027,670.
Patented May 28, 1912.
11 SHEETS—SHEET 6.
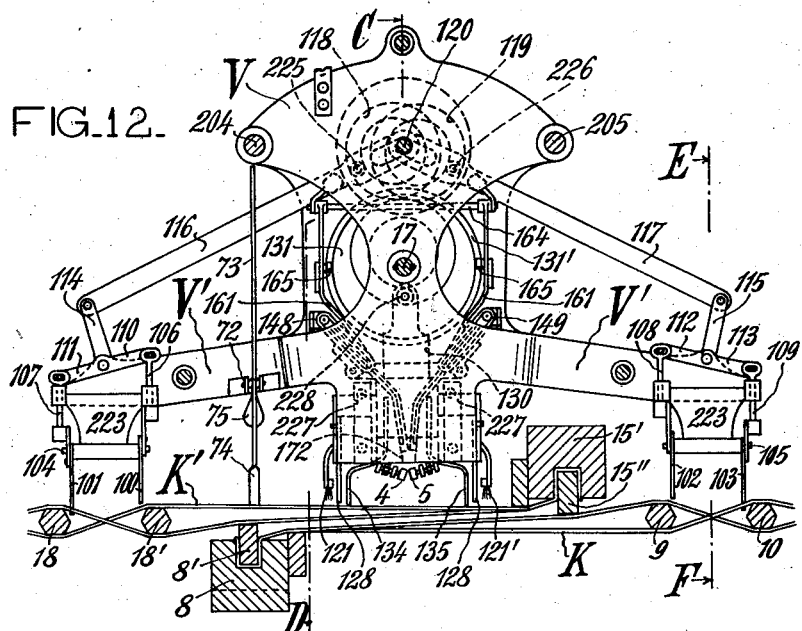
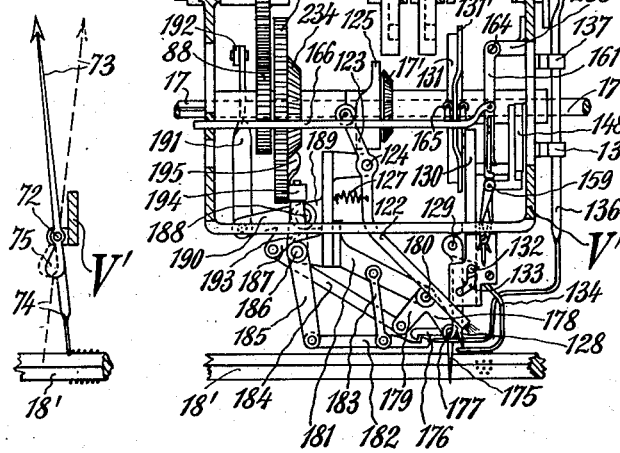
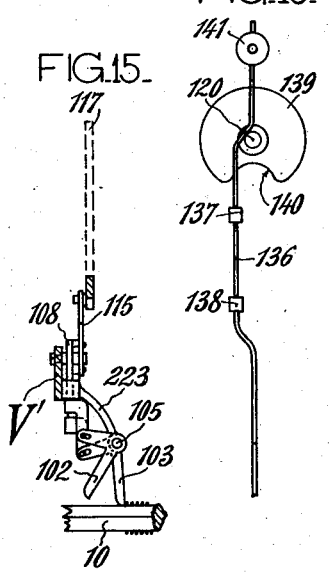
WITNESSES:
John N. Hoving.
Alfred R. Anderson.
INVENTOR:
ADALBERT SCHUSTER
by H. van Oldeneel
Attorney

A. SCHUSTER.
WARP TWISTING-IN MACHINE.
APPLICATION FILED NOV. 1, 1910.

1,027,670.

Patented May 28, 1912.
11 SHEETS—SHEET 7.

WITNESSES:
John N. Hoving.
Alfred R. Anderson.

INVENTOR:
ADALBERT SCHUSTER
by H. van Oldenneel
Attorney

COLUMBIA PLANOGRAPH CO., WASHINGTON, D. C.

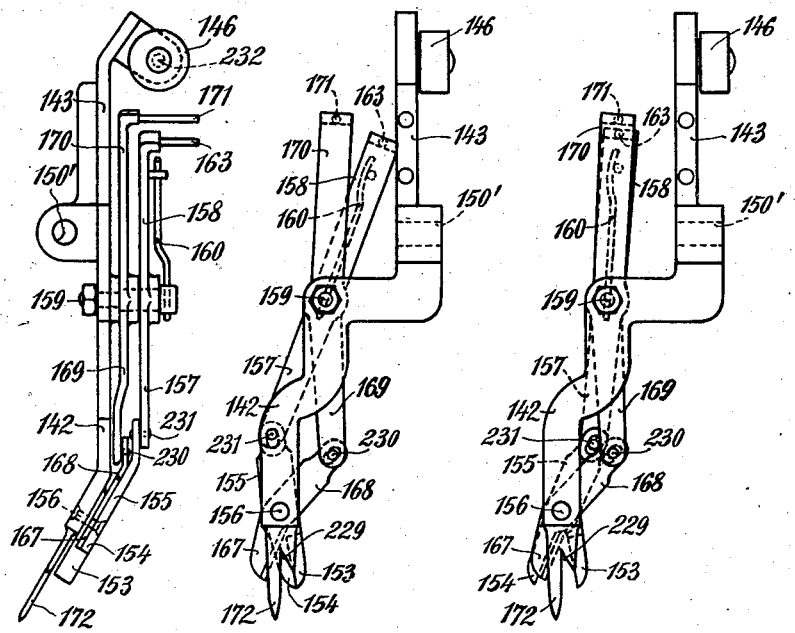

A. SCHUSTER.
WARP TWISTING-IN MACHINE.
APPLICATION FILED NOV. 1, 1910.

1,027,670.

Patented May 28, 1912.
11 SHEETS—SHEET 9.

WITNESSES:
John N. Hooing.
Alfred R. Anderson.

INVENTOR:
ADALBERT SCHUSTER
by H. van Oldenmal
Attorney

A. SCHUSTER.
WARP TWISTING-IN MACHINE.
APPLICATION FILED NOV. 1, 1910.

1,027,670.

Patented May 28, 1912.
11 SHEETS—SHEET 10.

WITNESSES:
John N. Hoving.
Alfred R. Anderson

INVENTOR:
ADALBERT SCHUSTER
by H. van Ledenmael
Attorney

A. SCHUSTER.
WARP TWISTING-IN MACHINE.
APPLICATION FILED NOV. 1, 1910.
1,027,670.
Patented May 28, 1912.
11 SHEETS—SHEET 11.
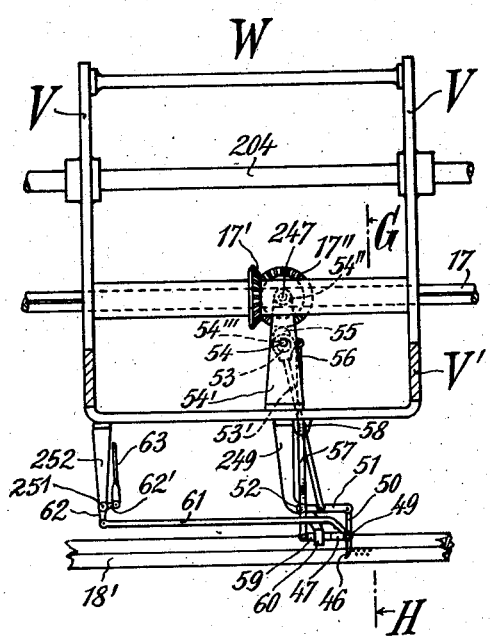
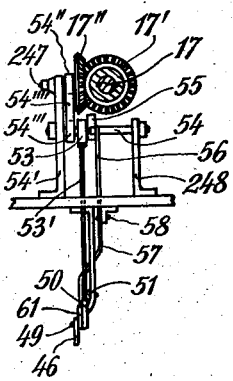
WITNESSES:
INVENTOR:
ADALBERT SCHUSTER

UNITED STATES PATENT OFFICE.

ADALBERT SCHUSTER, OF GLAUCHAU, GERMANY, ASSIGNOR TO GUSTAV HILLER, OF ZITTAU, GERMANY.

WARP-TWISTING-IN MACHINE.

1,027,670.  Specification of Letters Patent.  Patented May 28, 1912.

Application filed November 1, 1910. Serial No. 590,176.

*To all whom it may concern:*

Be it known that I, ADALBERT SCHUSTER, a subject of the King of Saxony, residing at Schiess-strasse, Glauchau, in the Kingdom of Saxony and Empire of Germany, have invented certain new and useful Improvements in Warp-Twisting-In Machines, of which the following is a specification.

With warp twisting-in machines working over the whole series of warps frequently a difficulty arises which consists in that the old and the new leases do not coincide with one another in spite of their numbers of warps being alike, as one lease may be broader than the other one. In consequence of this during the separation of the warp ends to be joined by twisting-in the respective warp end in one lease may be out of the reach of the separating tools, unless the latter have an extraordinarily large path. There is, however, a limit beyond which the path of the separating tools must not be extended, since the great speeds of these tools limit the speed of the twisting-in machine, if they are to work with the required safety, so that their practical value is like *nil*.

My invention relates to improvements in warp twisting-in machines, whereby the said difficulty is overcome easily and in a practical manner, while the operation of the machine is rendered certain and safe.

The chief improvement consists in a subsidiary carriage being movable on a main carriage, in which subsidiary carriage the warp ends of the new lease are secured, while the warp ends of the old lease are secured in the main carriage. Thereby it is rendered possible to so shift the subsidiary carriage in one or the other direction as to bring the respective warp ends in both leases to be separated into practically the same vertical plane. When the machine has completed its work of twisting the warp ends of a new lease into the warp ends of an old lease, the main carriage can be exchanged for another main carriage with its carriage meanwhile charged with the warp ends of two other leases, so that the machine can be at once started again to perform its work. The warp beam with the new warps, the ends of which have been twisted into the warp ends of the old lease, can be taken off the first main carriage together with the old warp beam and the appertaining heddles and shafts. Hereupon the main carriage is freshly charged with an old warp beam and the appertaining heddles and shafts, the ends of said old warp being secured in the clamp on the main carriage; the new warp beam is introduced in the main carriage, while the ends of the new warp are secured in a clamp on the subsidiary carriage.

Another improvement consists in connecting the main carriage with its subsidiary carriage by a screw spindle, which by means of a gearing is turned in one or the other direction for displacing the subsidiary carriage with the new lease in relation to the main carriage with the old lease. However, it is in most cases sufficient to actuate this gearing by hand. In this case an indicator in contact with an extreme new warp end is employed, which by its position indicates to the operator whether or not he is to turn the screw spindle and in what direction.

The machine proper comprises a frame beneath which the main carriages run on rails and each main carriage is provided with spring-pressed bolts for engaging in notches in the rails. After withdrawing the spring-pressed bolts the main carriage can be moved away from the machine, while another main carriage can be moved into its place and therein secured by means of its spring-pressed bolts in the correct position with regard to the machine. Above the respective main carriage a twisting-in carriage is mounted on the frame to move in the transverse direction over the warps and is adapted to be moved by means of a chain attached to its two side plates and passing over two guiding pulleys at the ends of the frame. A horizontal driving shaft is mounted in the frame to turn and is adapted to feed the twisting-in carriage by means of a gearing. The said driving shaft has loose on it a driving belt cone, with which it can be coupled by means of a friction clutch. A special feeler device is provided for automatically stopping the machine by means of the said friction clutch. Another feeler device is provided for automatically regulating the feed of the twisting-in carriage. The feelers of the last named sensitive device are periodically raised and lowered, so as to permit the twisted-in warps to pass under them to the finished portion of the joined lease.

The old devices for separating the warps to be twisted in from the unfinished warp ends required a careful distribution of the warps by powerfully pushing back the warp ends in the lease and by parts moving through great distances for bringing the separated warps within the reach of the seizing tools serving for applying the warp ends to the twisting-in tools. The driving devices for actuating the distributing means rendered however, the machine complicated and the excessively long paths of the means applying the warp ends to the seizing tools reduced the speed of the machine. Now I employ brushes for separating the warp ends to be twisted in from the unfinished warp ends in the two leases. These brushes are capable of safely separating the said warp ends from the others and of placing them into such a position, that they can be certainly seized and applied to the twisting friction disks. Means are provided for keeping down the warp ends at their crossing point, while tongs and scissors are provided and actuated for automatically seizing and cutting the warp ends near the outer clamps, then applying them in a safe manner to the twisting friction disks.

I will now proceed to describe my invention with reference to the accompanying drawings, in which—

Figure 6:
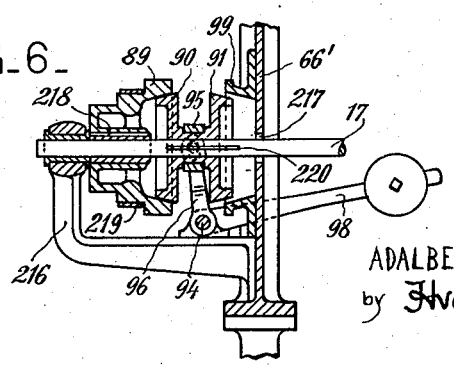
Figure 17:
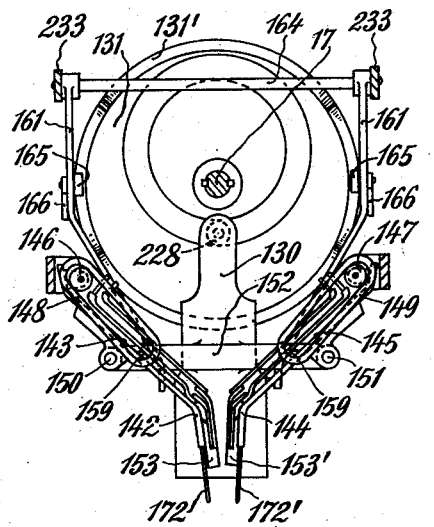
Figure 18:
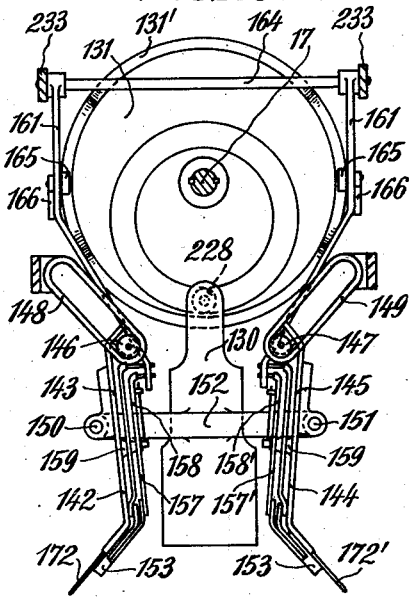
Figure 19:
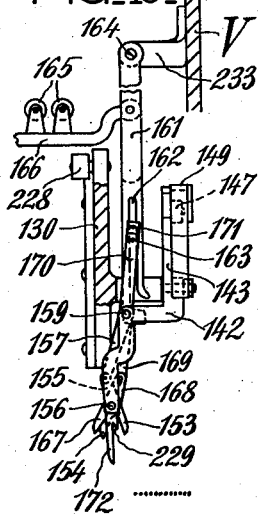
Figure 20:
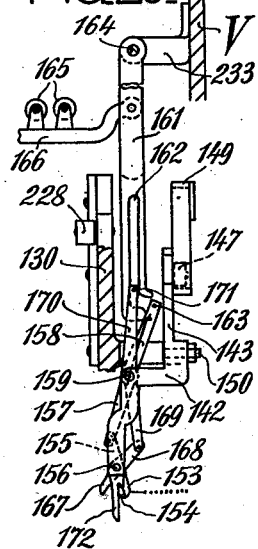
Figure 21:
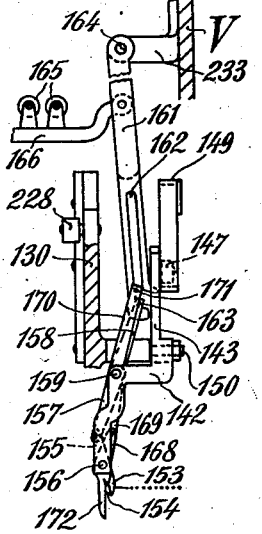
Figure 25:
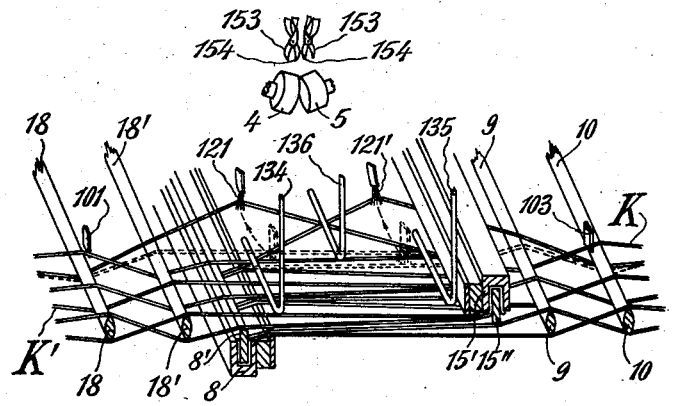
Figure 26:
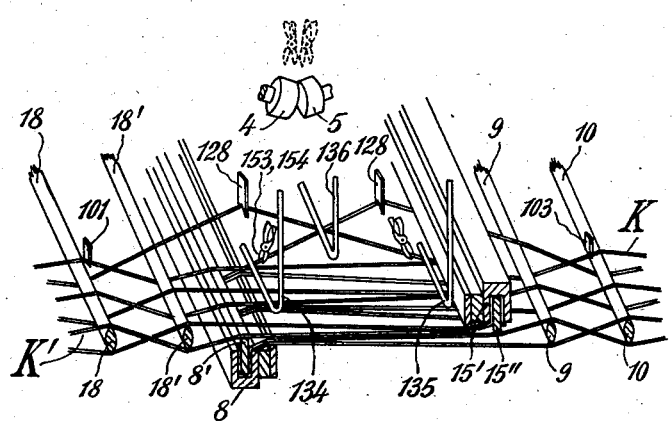
Figure 27:
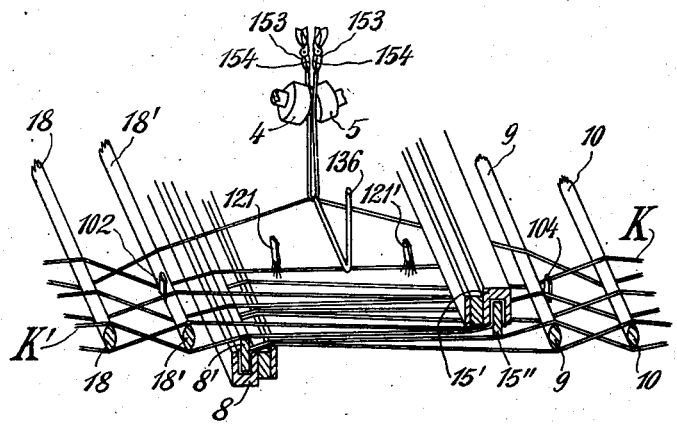
Figure 28:
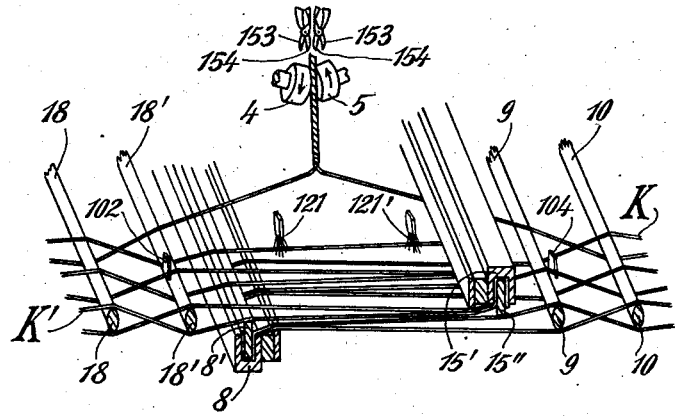

Figure 1 is a front elevation of the warp twisting-in machine, Fig. 2 is a plan view of the upper part of the same, Fig. 3 is a side view of the upper part of the left standard and shows the driving gear, Fig. 4 is a diagrammatic perspective view and shows parts of the device for automatically stopping the machine, Fig. 5 is a vertical section through the broken line A—B in Fig. 1, Fig. 6 is a vertical longitudinal section on an enlarged scale through the driving belt cone, the friction clutch and a part of the left standard in Fig. 1, Fig. 7 is a top view on an enlarged scale of the main carriage and its subsidiary carriage, an intermediate part being omitted, Fig. 8 is a diagrammatic perspective view and illustrates the manner in which the feeler device is permitted to influence the feed of the twisting-in carriage, the feeler of this device being shown to be in contact with the extreme warp end of the old lease, before it is separated and twisted into the corresponding warp end of the new lease, Fig. 9 is a side view on an enlarged scale of the upper part of the machine on the right in Fig. 1, Fig. 10 is similar to Fig. 9 and shows certain parts in other positions, Fig. 11 is a plan view of the same, Fig. 12 is a part out of Fig. 5 and shows on an enlarged scale the twisting-in carriage, further two leases to be joined by twisting-in, also the indicator for the adjustment of the subsidiary carriage, Fig. 13 is a front elevation of this indicator and a portion of one dividing bar below, Fig. 14 is a vertical longitudinal section through the line C—D in Fig. 12, Fig. 15 is a vertical section through the line E—F in Fig. 12, Fig. 16 is a rear elevation of the warp keeping-down device and is a view from right to left in Fig. 14, Fig. 17 is a part out of Fig. 12 on an enlarged scale and shows the tongs and scissors in their upper position, in which they are moved together, Fig. 18 is similar to Fig. 17 and shows the tongs and scissors in their lower position, in which they are moved apart, Fig. 19 is a longitudinal section through the parts shown at Fig. 17, the driving shaft 17 with the cam disk 131 being omitted, Fig. 20 is a similar section and corresponds to Fig. 18, the tongs alone being closed, Fig. 21 is a similar view, in which both the tongs and the scissors are closed, Fig. 22 is a part out of Fig. 18 and shows one pair of tongs and scissors, Fig. 23 is a front elevation of the same and corresponds to Fig. 20, Fig. 24 is a similar view and shows both the tongs and scissors to be open, Fig. 25 is a perspective view and illustrates diagrammatically the manner, in which the brushes separate the warp ends to be twisted-in, Fig. 26 is a similar view and illustrates the manner, in which the appliers hold the separated warp ends and the tongs seize the warp ends near the outer clamps, before they are cut through, Fig. 27 is a similar view, in which the tongs have lifted the cut warp ends and apply them to the twisting-in friction disk, while the warp ends at their crossing point are kept down, Fig. 28 is a similar view, in which the friction disks have twisted the warp ends and the tongs have released them, Fig. 29 is a part out of Fig. 14 and shows the transmission of motion from the driving shaft 17 to certain parts shown in Fig. 8, and Fig. 30 is a vertical cross section through the line G—H in Fig. 29.

Similar characters of reference refer to similar parts throughout the several views.

The frame of the machine consists of a base plate 201 of any suitable construction, two standards 66 and 66' (Fig. 1), a top beam 203 (Fig. 5), and two parallel horizontal round rods 204 and 205 (Figs. 3 and 5) connecting together the two standards. The left standard 66' in Fig. 1 may be stiffened by a prop 202, if so preferred, this prop being omitted from Fig. 5. The base plate 201 is provided with two parallel rails 200, 200 at right angles to the beam 203. On these rails 200, 200 the four wheels 206, 206 of a main carriage 1 of any known construction are made to roll. Both rails 200, 200 have each a notch 199 (Fig. 5), in which a spring-pressed bolt 198 of any known construction guided in the carriage 1 can engage. The bolts 198 may have at their upper ends handles by means of which they can be withdrawn from the notches 199, so that the main carriage can be drawn out from under the frame of the machine or moved in. The bolts 198 serve for securing the main carriage 1 in its correct position with regard to the frame of the machine.

The top of the main carriage 1 is cut out from the front to a point a little beyond its middle, as is clearly shown at Fig. 5. In this recess are disposed two rails 11 and 12 parallel to the beam 203, and on these rails the four wheels 13, 13′, 13″, 13‴, (Fig. 7) of a subsidiary carriage 15 are made to roll. A screw spindle 19 parallel to the beam 203 is mounted in the subsidiary carriage 15 to turn and is in any known manner prevented from longitudinal motion. It engages in a projection 20 provided on the main carriage 1 and serving as a nut. A shaft 23 at right angles to the beam 203 is mounted in the subsidiary carriage 15 and meshes with the screw spindle 19 by means of bevel wheels 21 and 22. At the front end of the shaft 23 is fastened a hand-wheel 24, by means of which the subsidiary carriage 15 can be displaced with regard to the main carriage in either direction. Two parallel rolls 6 and 7 (Fig. 5) are mounted to turn in the main carriage 1 below at the front and serve for supporting the end disks 2′, 2′ of any new warp beam 2. A guiding roll 207 is mounted to turn in the subsidiary carriage 15 at the front and its shaft carries a hand-wheel 208, by means of which the roll 207 can be turned. The roll 207 is rigidly connected at the other end with a ratchet wheel 213, in which a pawl 214 provided on the carriage 15 can engage. Two projections 209, 209 (Figs. 5 and 7) are provided on the carriage 15 for carrying two parallel dividing bars 18, 18′ (Fig. 12). The subsidiary carriage 15 is moreover provided with two brackets 210, 210 for carrying a clamping bar 15″, over which a grooved clamping member 15′ (Fig. 12) can be put. The carriage 15 forms a rectangular frame, within which two brackets 211, 211 fastened on the main carriage 1 are disposed. They carry a grooved clamping member 8 (Fig. 12), which may be undercut at its two ends, so as to permit the subsidiary carriage 15 to move through a convenient distance beneath it. A clamping bar 8′ can be inserted in the groove of the member 8. Two projections 212, 212 (Fig. 7) are provided on the main carriage 1 for supporting two parallel dividing bars 9 and 10. A roll 82 with a longitudinal groove 81 is mounted in the main carriage 1 at the rear to turn and its pin 84 carries a hand-wheel 85 and the other pin 84′ a ratchet wheel 86, in which a pawl 87 on the carriage 1 engages. The main carriage 1 is at the rear provided with a frame 213′ (Fig. 5) above and a tightening device 214′ of any known construction below. The frame 213′ and the tightening device 214′ serve for holding the shafts 3, 3′ and heddles 215, 215′ of any old lease, the dividing bars 9 and 10 of which are placed in the two projections 212, as mentioned above, while the right warp ends are secured in the groove 81 of the roll 82 by means of a clamping bar 83, and the left warp ends are secured in the grooved clamping member 8 (Fig. 12) by means of the clamping bar 8′, after which the warps are conveniently tightened by turning the hand-wheel 85 in the respective direction. The warps from any new warp beam 2 placed on the two rolls 6 and 7 are passed upward over the guiding roll 207 and alternately over and under the two dividing bars 18, 18′ so as to form the new lease, while the warp ends are placed over the clamping bar 15″, after which they are secured by putting the grooved clamping member 15′ over them (Fig. 12). Then the warps are conveniently tightened by turning the hand-wheel 208 and the warp beam 2 in the respective direction. In this manner the main carriage 1 is charged with the old lease and the subsidiary carriage 15 with the new lease, after which the main carriage 1 carrying the subsidiary carriage 15 can be moved on the rails 200, 200 to the front under the frame 203, 204, 205 of the machine, until the spring-pressed bolts 198 engage in the notches 199 and lock the carriage 1.

In Fig. 12 the two leases are shown to be superposed at a small distance from one another for the sake of clearness. In practice, however, it is possible to bring the two leases so near together as to place the lower warps of the new lease K′ between the clamps 15′, 15″ and the dividing bar 18′ and the upper warps of the old lease K between the clamps 8, 8′ and the dividing bar 9 in nearly the same plane.

In the frame of the machine the two round rods 204 and 205 serve not only as distance pieces, but also as guides for a twisting-in carriage W consisting of two parallel shields V V (Figs. 1, 2, 4, 5, 8, 12 and 14) and suitable stays between them. In the right standard 66 in Fig. 1 and in a bracket 216 (Fig. 6) at the left standard 66′ a driving shaft 17 is mounted to turn, which passes through a hole 217 in the left standard 66′ and through the two shields V V. In the bracket 216 is secured a tube 218, on which a driving cone 89 is loosely mounted, which is to be driven from some source of power by a belt 219. On the right side in Fig. 6 the driving cone 89 is conically bored, so as to serve as a friction clutch member. An annular friction member 99 is fastened on the left standard 66′ concentrically with the shaft 17 and a double friction clutch 90, 91 is mounted on the shaft 17 to move longitudinally, while it is prevented from turning by two feathers 220 engaging in its grooves. The friction clutch 90, 91 has in the outside of its nave a groove, in which a two-part ring 95 engages. The ring 95 engages with two opposite pins in corresponding slots at the free forked end of an arm 96 (Fig. 3) fastened on a shaft 94, which is mounted to turn in suitable bearings on the bracket 216 and has fastened on it a horizontal weighted arm 98 (Figs. 1, 4 and 6), an arm 97 and a vertical arm 93. The arm 93 has at its free end a slot in which a pin 221 at the left end of a rod 92 engages. This rod passes over the whole machine and is guided in suitable supports 222 on the two standards 66 and 66'. A horizontal shaft 174 (Figs. 2, 3, 4 and 5) is mounted to rock in the two standards 66 and 66' and has fastened on it an arm 173. The shaft 174 is for the major part made square and carries an arm 192 which is obliged to partake of its rocking motion and besides, can be moved longitudinally on the shaft 174 by means of a fork 197 fixed to the one shield V. The arm 192 is pivotally connected by a rod 191 with the arm 190 of a bell-crank lever 190, 187 to be referred to later on. The rod 92 serves for starting the machine by hand, the friction clutch being pressed with its member 90 into the driving cone 89 and the arm 97 rounded off at its free end raising the locking arm 173, until the latter snaps behind it and locks it.

The driving shaft 17 is between the two standards 66 and 66' longitudinally grooved and passes through two gear wheels 88 and 196 (Fig. 14), two bevel wheels 234 and 17' two cam disks 125 and 131 and suitable annular distance pieces between them and the two shields V V. The gear wheels 88, 196, 234, 17' and cam disks 125, 131 engage with feathers in the longitudinal grooves of the driving shaft 17 and are thereby prevented from turning. A shaft 120 parallel to the driving shaft 17 is mounted in the two shields V V to turn and has fastened on it a gear wheel 88' and three cam disks 118, 119 and 139. The gear wheel 88 on the shaft 17 meshing with the other gear wheel 88' thereby drives the shaft 120.

The right shield V in Figs. 1, 2 and 14 has at the lower end two long opposite extensions V' V' (Figs. 5 and 12), at the free ends of which brackets 223, 223 (Fig. 15) are fastened. The brackets 223, 223 form in their upper part guides for the four slides 106, 107, 108, 109 (Fig. 12) and have below two pins 104 and 105. The four slides 106, 107, 108, 109 are at their upper ends horizontally slotted. In the slots of the two slides 106 and 107 engage pins at the free ends of two horizontal arms 110, 111 of a three-armed bell-crank lever 110, 111, 114, and in the slots of the two other slides 108 and 109 engage pins at the free ends of two horizontal arms 112, 113 of another three-armed bell-crank lever 112, 113, 115.

The upper arm 114 is pivotally connected with a rod 116 having at its upper end a longitudinal slot, through which the shaft 120 (Fig. 14) passes, so that by this shaft the rod 116 is longitudinally guided, while it is prevented from endwise motion on the shaft by the cam disk 118 and a loose collar 224 with set-screw. The rod 116 carries near its upper end a roller 225 which engages in the groove of the cam disk 118. It will be seen, that during each revolution of the shaft 120 the rod 116 is once reciprocated and consequently the two slides 106 and 107 are once reciprocated in opposite directions. The other upper arm 115 is pivotally connected with a rod 117 similar to 116 and engaging with its roller 226 in the groove of the cam disk 119. The two cam disks 118 and 119 are so set on the shaft 120 as to simultaneously move the two upper arms 114 and 115 in opposite directions. The slide 106 is pivotally connected with a bell-crank lever 100 (similar to 102 shown at Fig. 15) rocking on the pin 104, and the other slide 107 is pivotally connected with a similar bell-crank lever 101 rocking on the pin 104. In a similar manner the two other slides 108 and 109 are pivotally connected with two bell-crank levers 102 and 103 (Fig. 15) respectively. From Fig. 12 it will be seen, that of the two bell-crank levers 100 and 101 only one (for example 101) can strike with its vertical arm the extreme warp (on the left in Fig. 1) of the new lease K' (in this case the warp on the dividing bar 18), while the other lever (100) is withdrawn out of contact with the next following warp (on the other dividing bar 18'). The same is the case with the two other bell-crank levers 102, 103. It is to be noted, that the two bell-crank levers which are at the time active (in this case 101 and 103) always strike the old warp end and the new warp end, which are to be joined by twisting-in.

The front extension V' is provided with two lugs carrying a pin 72 (Figs. 12 and 13), on which an indicator 73 is mounted to rock between the two lugs. The indicator 73 is eccentrically loaded by a weight 75 and its lower arm 74 is adapted to bear against the extreme new warp end not yet joined or twisted-in. It is further to be noted, that the lower arm 74 of the indicator 73 can only bear against any new warp end passing over the dividing bar 18' and that after the twisting-in of this new warp end into the corresponding old warp end passing under the dividing bar 9 the joined warp ends will move practically into the straight line connecting the upper corner of the left bar 18' with the lower corner of the right bar 9 in Fig. 12. In other words, the new warp end will lower and thus move out of the reach of the lower arm 74 of the indicator, which will then strike against the next following new warp end passing over the bar 18'. The operator watching the indicator 73 will be enabled to so shift from time to time the subsidiary carriage 15 by means of the hand-wheel 24, as to bring the indicator 73 nearly into a vertical position and consequently the warp ends about to be twisted-in practically into the same vertical plane.

The right shield V in Fig. 14 is on the right side provided with two guides 137 and 138 for a vertical bar 136 which at the upper end is bent and loaded with a weight 141, while its lower end serves for keeping down the two warp ends about to be twisted together (Fig. 27). The upper bent end of the bar 136 rides over the periphery of the cam disk 139 having a recess 140 (Fig. 16), and it will be evident, that normally the bar 136 occupies an upper position and that it is only lowered on its upper bent end engaging in the recess 140. The bar 136 is shown to be doubly bent in order not to collide with the driving shaft 17, which is in the central line of its two ends.

The right shield V in Fig. 14 is on the left side provided with guides 227, 227 (Fig. 12) for a slide 130, which at its upper end is provided with a roller 228 engaging in the groove of the cam disk 131 (Figs. 17 and 18), whereby the slide 130 is vertically reciprocated. On the slide 130 two opposite holding-down wires 134, 135 (Fig. 12) may be fastened, which for their upper portions are doubly bent in their common plane and are below bent at right angles to this plane, so that their lower portions parallel to the clamping members 15' and 8 are adapted to hold down the warp ends not yet joined, see Figs. 25 and 26. In this manner the said warp ends are prevented from jumping. Where so preferred, the two holding down wires 134 and 135 may be fastened on the shield V instead of on the slide 130. At the lower end the slide 130 is rigidly connected with a horizontal bar 152 (Figs. 17 and 18), which at its ends carries two parallel pins 150 and 151. The pin 150 engages in a hole 150' of a two-armed crooked lever 142, 143 (Figs. 22, 23, 24), so that the latter can rock on the pin 150. The arm 142 is provided with a pin 159, on which two parallel two-armed levers 169, 170 and 157, 158 are mounted to rock. The lower arm 142 is bent as shown at Fig. 22 and preferably terminates in a finger 172 provided with an acute notch 229. The finger 172 serves for better getting at the separated warp end and guiding it into the notch 229. Near the lower end the arm 142 is provided with a pin 156, on which the one piece 154 of a pair of tongs 153, 154 and a two-armed lever 167, 168 are mounted to rock. The part 153 is fixed with reference to arm 142 and serves not only as one member of the tongs, but also as one member of a pair of scissors, of which the other member is denoted by 167. The rear arm 168 of this member 167 has at its free end a slot, in which a pin 230 at the free end of the arm 169 engages. The other arm 170 of the lever 169, 170 is at the free end bent and provided with a long pin 171, which will be referred to later on. The rear arm 155 of the tongs member 154 has at its free end a slot, in which a pin 231 at the free end of the arm 157 engages. The other arm 158 of the lever 157, 158 is at the free end bent and provided with a long pin 163, which will likewise be referred to later on.

In the head of the pin 159 is fastened a spring 160, which tends to normally close the pair of tongs 153, 154. On the other pin 151 of the bar 152 a two-armed lever 144, 145 is mounted to rock, which is similar but opposite to the lever 142, 143 above described and also carries the further parts, which in Figs. 17 and 18 are denoted by the same characters of reference as in Figs. 22 to 24, only that these characters are primed. The upper ends of the arms 143 and 145 have pins 232 (Fig. 22), on which rollers 146 and 147 respectively are mounted to turn. These rollers 146, 147 engage in inclined slotted guides 148 and 149 (Fig. 18), which are fastened on the left side of the right shield V in Fig. 14.

The right shield V in Fig. 14 is provided on the left side with lugs 233, 233 (Figs. 17 to 21), in which a shaft 164 is mounted to rock. Fastened on this shaft 164 are two bent levers 161, 161, which have each a longitudinal slot 162 terminating in a lateral outlet or mouth. The two levers 161, 161 are pivotally connected with two bars 166, 166, the other ends of which are guided in suitable holes in the left shield V in Fig. 14. Each bar 166 carries two rollers 165, 165, between which a cam 131' provided on the periphery of the cam disk 131 is made to engage. It will be understood, that during each revolution of the driving shaft 17 the two levers 161, 161 will be twice reciprocated and at the same time the slide 130 will be once vertically reciprocated.

For the upper position of the slide 130 shown at Figs. 17 and 19 the two rollers 146 and 147 on the lever arms 143 and 145 will occupy their upper positions in the two inclined guides 148 and 149, so that they are at the maximum distance from one another, while at the same time the fingers 172, 172', the tongs members 153, 154 and scissor members 167 on the lever arms 142 and 144 respectively will occupy their upper position, in which they are at the minimum distance from one another. At the same time the pins 163 and 171 of the levers 157, 158 and 169, 170 will occupy their upper position in the slots 162 of the levers 161, 161, which means that they are in the same vertical plane (Fig. 19) and consequently the two pairs of tongs 153, 154 and 153', 154' and the two pairs of scissors 153, 167 and 153', 167' will be opened (Fig. 24). On the contrary for the lower position of the slide 130 shown at Figs. 18, 20 and 21 the two rollers 146 and 147 will occupy their lower position in the two inclined guides 148 and 149, so that they are at the minimum distance from one another, while at the same time the fingers 172, 172', the tongs members 153, 154 and scissor members 167 will occupy their lower position, in which they are at the maximum distance from one another. It depends upon the position of the two levers 161, 161, whether the scissors and tongs are closed or not. When the levers 161, 161 occupy their extreme position on the right in Fig. 21, the pins 163 and 171 will be nearly in a vertical plane, so that both the scissors and the tongs will be closed, but when the levers 161, 161 occupy their extreme position on the left in Fig. 20, the pins 163 and 171 will be at the maximum distance from one another (which is permitted by the mouths of the slots 162), so that the tongs remain closed as before (Fig. 21), but the scissors will be opened.

In suitable brackets secured between the two shields V V a shaft 124 (Fig. 14) is mounted to rock, which has fast on it two parallel crooked arms 122 carrying at their free ends brushes 121, 121' (Fig. 25). One arm 122 has an upper arm 123 carrying at the free end a roller, which under the action of a helical spring 127 at the lower arm 122 is adapted to roll on the cam disk 125, so that thereby the two arms 122, 122 with the brushes 121, 121' are once reciprocated during every revolution of the driving shaft 17. The two brushes 121 and 121' are adapted to engage the extreme warp ends of the two leases K and K' respectively on the left in Fig. 14 and to push them to the left in Fig. 14 (see Fig. 25).

The slide 130 carries at its lower end a horizontal pin 129 (Fig. 14), on the two ends of which two parallel appliers 128, 128 are mounted to rock. The lower free ends of the appliers 128, 128 are each cut out somewhat like an inverted V (Fig. 26), so that they are adapted to engage the warp ends just separated by the brushes 121, 121'. The appliers 128, 128 have eccentrically put on them pins 132, 132, which engage in bent slots 133 provided in guides fastened on the right shield V in Fig. 14. As long as the pins 132 move in the upper vertical portions of the slots 133, the two appliers 128, 128 will occupy their vertical position as shown in Fig. 14, but on the slide 130 reaching its lower position the pins 132 will move in the inclined portions of slots 133, whereby the appliers 128, 128 are turned to the left in Fig. 14 while they take the warp ends along with them.

In a suitable support 181 between the two shields V V a shaft 186 (Fig. 14) is mounted to rock, which has fastened on it an upper arm 193 and at the ends two lower arms 185. The upper arm 193 carries a roller 194, which is adapted to periodically roll over a cam 195 provided on the gear wheel 196, whereby the levers 185, 193 are rocked for a short time once during every revolution of the driving shaft 17. The two lower arms 185 are pivotally connected with two hooks 182, which are suspended from the support 181 by links 183. In the lower end of the support 181 a shaft 180 is mounted to rock, which has fastened at its ends two parallel bell-crank levers 178, 179 for the two leases. The arm 178 of each bell-crank lever has at the free end a pin 177, on which another bell-crank lever 175, 176 can rock. The pendent arm 175 of each lever serves as a feeler and normally bears against the extreme warp end on the left in Fig. 14 in the respective lease, while the horizontal arm 176 forms a hook which can engage the corresponding hook 182. As long as either feeler 175 bears against a warp end, its arm 176 will be kept at a small height above the corresponding hook 182 and consequently out of the path of the latter. If any warp end fails, the corresponding arm 176 will drop into engagement with the hook 182, so that during the passage of the roller 194 over the cam 195 the hook 182 will pull the arm 176 and thereby turn the bell-crank lever 178, 179 in the direction of the rotation of the hands of a watch. The arm 179 of the bell-crank lever 178, 179 is by a rod 184 pivotally connected with the lower arm 187 of the bell-crank lever 187, 190 rocking on a pin 188 at a lug 189 provided on the support 181. The turn of the above mentioned arm 192 (Fig. 4) downward is in any known manner limited by some stop provided somewhere, for example beneath the arm 190 or 187, while the turn of the arm 192 upward is so determined by the cam 195 on the gear wheel 196 and by the ratios of transmission as to permit the locking arm 173 (Fig. 4) to release the arm 97 and thereby the weighted arm 98. It will be now seen, that in this manner either of the two feelers 175 will on the respective warp end failing cause the driving shaft 17 to at once stop, as the left friction member 90 (Fig. 6) will be withdrawn from the driving cone 89 and the right friction member 91 will be forced into the stationary friction ring 99.

The bevel wheel 234 (Fig. 14) on the driving shaft 17 meshes with another bevel wheel 235 (Fig. 1), which by a transmission gear and two belts drives two twisting-in friction disks 4 and 5 (Figs. 25 to 28). This transmission (omitted from Fig. 14 for want of space) is indicated in Fig. 1, but I do not further describe it, as it is the same as the transmission shown and described in the U. S. Patent No. 913,499. The two friction disks 4 and 5 are inclined to one another and are driven in opposite directions, as is clearly shown in Fig. 28, so that they are adapted to twist any two warp ends introduced between them. Further devices described in the said patent should also be employed for finishing the twisted warp ends.

The two shields V V of the twisting-in carriage W are by hooks (Fig. 1) or the like connected with the ends of a chain 25 passing over two chain wheels 26 (Figs. 8, 10 and 11) and 26' on the two standards 66 and 66'. The shaft 39 of the chain wheel 26 carries a hand-wheel 255, by means of which the carriage W can be moved in either direction by hand. The twisting-in carriage W is to be fed in the direction from left to right in Fig. 1 in the following manner. A shaft 32' is mounted in the right standard 66 (Fig. 1) and in a bracket 236 (Fig. 11) thereon to turn and is connected with the right end of the driving shaft 17 by means of an endless chain 237 and two like chain wheels of which only 239 is to be seen on the drawings on shaft 32'. The shaft 32' consequently makes one revolution on every revolution of the driving shaft 17. The shaft 32' carries at its outer end a slotted crank 32, in the slot of which the crank pin 240 can be longitudinally adjusted in any known manner. The crank pin 240 is by a connecting rod 33 connected with a crosshead 241, which moves in two parallel guides 242 provided on a suitable bracket 243 fixed to the standard 66. By adjusting the pin 240 in the slotted crank 32 the stroke of the crosshead 241 can be varied, as may be required. The crosshead 241 is connected with a rod 31, the other end of which is forked and is guided by the shaft 32'. It will be seen, that during each revolution of the shaft 32' the rod 31 is once reciprocated. The rod 31 is for a short length provided with gear teeth and serves as a rack. A shaft 244 is mounted in the standard 66 and in a bracket 245 thereon to turn and has fastened on its outer end a gear wheel 34 and a ratchet wheel 27, while a crank 29 is loose on it. The crank 29 meshes by means of gear teeth 30 with the above mentioned rack 31, so that during the rotation of the driving shaft 17 the crank 29 is made to constantly rock. The crank 29 has a pin on which a spring-pressed pawl 28 can rock. The pawl 28 is in a manner to be described later connected with a two-armed lever 40, 41 and can be held out of engagement with the ratchet wheel 27 by a crooked spring 45 fastened on the crank 29. The gear wheel 34 meshes with another gear wheel 35 fastened on the outer end of a shaft 36, which is mounted in the standard 66 and in a bracket 246 to turn in bearings, that are in any known manner vertically movable and can be locked in both positions above and below. The shaft 36 carries at the outer end a hand-wheel 254 and is made in one with a worm 37, which meshes with a worm wheel 38 fastened on the shaft of the chain wheel 26. When the pawl 28 with the two-armed lever 40, 41 occupies the position shown at Fig. 9, it will during the rotation of the driving shaft 17 periodically feed the ratchet wheel 27, whereby of course the twisting-in carriage W is periodically fed through a small distance.

A feeler device of the following construction is provided for moving the pawl 28 into and out of engagement with the ratchet wheel 27 (see the left and right positions of the crank 29 in Fig. 10) and thus regulating the feed of the carriage W. The bevel wheel 17' (Figs. 14, 29 and 30) on the driving shaft 17 meshes with another bevel wheel 17'', which is loose on a pin 247 fastened in a suitable support 54' and is made in one with a small pulley 54''. The latter is connected by an endless belt 54'''' with another small pulley 54''' fastened on a shaft 54, that is mounted to turn in the support 54' and in another one 248. The shaft 54 has fast on it an eccentric 53 (Fig. 8) and a cam disk 55. A support 249 fastened on the twisting-in carriage W carries above the lower bent end a pin 52, on which a lever 51 is mounted to rock. This lever is pivotally connected with the rod 53' of the eccentric 53 and carries at its free end a link 50, which at its lower end is provided with a pin 49. On this pin a bell-crank lever 46, 47 is mounted to rock, of which the arm 46 serves as a feeler and the other arm 47 forms a hook. In the lower end 60 of the support 249 a hook 59 is horizontally guided, which can engage the hook 47 and is at the other end pivotally connected with the lower arm 57 of a two-armed lever 56, 57 rocking on a pin 58. The upper arm 56 carries at its free end a roller 250 and is therewith constantly pressed against the periphery of the cam disk 55 by some known spring (not shown).

It will be seen, that during the rotation of the driving shaft 17 the hook 59 is constantly reciprocated and the lever 51 is constantly moved up and down, so as to permit the twisted-in warp to pass under the feeler 46. The pin 49 at the link 50 is by a rod 61 pivotally connected with the lower arm 62 of a bell-crank lever 62, 62' rocking on a pin 251 at a suitable support 252. Various parts shown at Figs. 29 and 30 are omitted from Fig. 14 for the sake of clearness. For the same reason various parts on the driving shaft 17 shown at Fig. 14 are omitted from Figs. 29 and 30. The upper arm 62' of the bell-crank lever 62, 62' is by a rod 63 pivotally connected with an arm 64 which is longitudinally movable on a square shaft 65 (Fig. 8) and can be moved by the carriage W by means of a forked arm 67, 68 fastened on one shield V. The shaft 65 is mounted to turn in two supports 253, 253 (Fig. 1) on the two standards 66, 66' and carries at the right free end an arm 69 (Fig. 8), which is pivotally connected with a vertical bar 44 (Figs. 9 to 11). The lower part of the bar 44 is shown to be cylindrical and guided in a suitable projection of the support 243, and a helical spring 71 surrounding this cylindrical part serves for normally pressing the bar 44 into its upper position shown at Figs. 9 and 10. The bar 44 is provided with two stops 42 and 43, of which the upper stop 42 is adapted to strike the upper end of the arm 40 during the turn of the crank 29 from left to right for turning the pawl 28 into engagement with the ratchet wheel 27, while the lower stop 43 is adapted to strike the lower end of the arm 41 during the turn of the crank 29 from left to right for turning the pawl 28 out of engagement with the ratchet wheel 27. The two arms 40 and 41 are so arranged, that they can normally move freely between the two stops 42 and 43 during the rocking motion of the crank 29 as long as the pawl 28 occupies either of its two extreme positions, and that any of the arms can be turned by the corresponding stop 42 or 43 only through one part of its turn, whereupon the spring 45 will further turn the two arms into the respective extreme position. In this manner the two stops 42 and 43 are prevented from further influencing the pawl 28, until the latter is reversed. Each time when the lever 51 is lowered by the eccentric 53, the extreme warp end of the old lease K on the left in Fig. 8 will push the feeler 46 to the left in Fig. 8 and thereby turn the hook 47 out of the path of the hook 59, so that the reciprocating motion of the latter will produce no effect whatever. However, when the pressure of the extreme warp end diminishes the hook 47 will during the downward motion of the lever 51 engage the hook 59 (it being in any known manner prevented from turning beneath the horizontal position), so that the hook 59 will pull the arm 47 and thereby and by the rod 61 turn the arm 62 to the left, so that the upper arm 62' will by the rod 63, the arm 64, the shaft 65 and the arm 69 press the bar 44 downward while overcoming the tension of the helical spring 71. Then the upper stop 42 will engage in the path of the upper arm 40 during the turn of the crank 29 from left to right in Fig. 10 and strike the arm 40 for turning the pawl 28 into engagement with the ratchet wheel 27. Then the machine will feed the carriage W forward from left to right in Fig. 1.

The twisting-in machine operates in the following manner: Assuming that the belt cone 89 is driven by the belt 219, but that the machine is at rest, the right friction member 91 in Fig. 6 engaging in the stationary friction ring 99 and that the twisting-in carriage W occupies its normal position on the left in Fig. 1 above the prop 202, then a main carriage 1 with its subsidiary carriage 15 charged in the above described manner with the two leases K and K' can be easily moved under the frame 203, 204, 205 and locked by the spring-pressed bolts 198. The shaft 36 (Figs. 9 to 11) with its movable bearings is pushed downward, so as to withdraw its worm 37 from the worm wheel 38, whereupon the hand-wheel 255 is turned for moving the carriage W to the right in Fig. 1, until the feeler 46 (Fig. 8) strikes the extreme left warp end in the old lease K. Then the shaft 36 is returned to its upper position, so that the worm 37 reëngages the worm wheel 38, and the hand-wheel 254 is turned for adjusting the carriage W with regard to the old lease K. The hand-wheel 24 (Fig. 5) at the subsidiary carriage 15 is, if necessary, so turned, as to bring the indicator 73 into its vertical position, in other words to bring the two extreme warp ends to be joined into the same vertical plane. The rod 92 is pushed by hand to the left in Fig. 1 for starting the machine by forcing the left friction member 90 into the driving pulley 89, while the arm 97 (Fig. 4) by its rounded-off end raises the locking arm 173, until the latter snaps behind it and locks it. Then in the manner described above the two brushes 121 and 121' will seize the extreme warp ends of the two leases K' and K (Fig. 25) and shift them to the left in Fig. 1, while say the vertical arms 101 and 103 (Fig. 12) keep back the next following warp ends. The two appliers 128, 128 will engage the extreme warp ends (Fig. 26) and move them to the left in Fig. 1, while the brushes 121 and 121' release them and move to the right in Fig. 14. The two pairs of tongs 153, 154 (Fig. 24) meanwhile lowered and moved apart (Fig. 18) will grip the warp ends near the clamping members 8 and 15' (Figs. 20, 23 and 26) whereupon the scissors 167 cut through the warp ends (Fig. 21) and the tongs 153, 154 raise them, while the lower bent end of the bar 136 (Figs. 14, 16, 25, 26 and 27) keeps down the warp ends at their crossing point. The tongs 153, 154 introduce the raised warp ends between the two friction disks 4 and 5 (Fig. 27), which then commence to twist the warp ends (Fig. 28) that slip off the end of the bar 136, while the tongs 153, 154 release them and the brushes 121 and 121' seize the next following warp ends. After the twisting-in the joined warp ends drop and permit the indicator 73 to move on and to strike with its lower arm 74 the next following warp end of the new lease K' passing over the dividing bar 18'. The two bell-crank levers 110, 111, 114 and 112, 113, 115 (Fig. 12) will have been meanwhile reversed, so that the vertical arms 101 and 103 are withdrawn and the other arms 100 and 102 engage the next following warp ends for slightly pushing them to the right in Fig. 1, if necessary, or for holding them in their correct position, as the case may be. The tongs and scissors are then again raised and moved together (Fig. 17). Then the whole series of occurrences described will repeat. The carriage W is fed intermittently, it being fed forward on the bar 44 being moved downward, so that the pawl 28 can engage the ratchet wheel 27 (Fig. 9) and turn it, whereupon the bar 44 is returned into its upper position and its lower stop 43 strikes the arm 41 for turning the pawl 28 out of engagement with the ratchet wheel 27. After the two last warp ends have been cut through and twisted in, the two feelers 175 (Fig. 14) being no longer pushed back will permit their arms 76 to engage the hooks 182, so that in the manner described above the cam 195 on the gear wheel 196 will cause the locking arm 173 (Fig. 4) to release the arm 97, whereupon the weighted arm 98 will withdraw the friction member 90 (Fig. 6) from the driving cone 98 and force the friction member 91 into the stationary ring 99, so that the machine will at once stop.

The warp twisting-in machine described can be varied in many respects without departing from the spirit of my invention.

I claim:

1. In a warp twisting-in machine of the class described, the combination with clamps for holding the warp ends of two superposed leases, of means for separating the two warp ends to be joined from the others, means for keeping down the separated warp ends at their crossing point, means for gripping the separated warp ends near said clamps, means for cutting the gripped warp ends off from said clamps, two friction disks, and means for raising the cut gripped warp ends and introducing them between said two friction disks which are adapted to twist them.

2. In a warp twisting-in machine of the class described, the combination with a frame, of a slide vertically guided in said frame and having two parallel pins at right angles to it, means for reciprocating said slide, two opposite two-armed levers mounted on said two pins to rock in a common vertical plane, two inclined guides fastened in said frame and adapted to so guide the upper arms of said two-armed levers as to move together their lower arms in the upper position and to move them apart in the lower position of said slide, two pairs of tongs on the lower arms of said two-armed levers, and means for operating said tongs.

3. In a warp twisting-in machine of the class described, the combination with a frame, of a slide vertically guided in said frame and having two parallel pins at right angles to it, means for reciprocating said slide, two opposite two-armed levers mounted on said two pins to rock in a common vertical plane, two inclined guides fastened in said frame and adapted to so guide the upper arms of said two-armed levers as to move together their lower arms in the upper position and to move them apart in the lower position of said slide, two pairs of tongs on the lower arms of said two-armed levers and adapted to open and close in planes severally parallel to said two pins, springs for normally closing said tongs, two guiding levers on said frame adapted to open said tongs against the tension of said springs during the motion of said slide and to release them only in the lower position of the slide, and means for reciprocating said two guiding levers.

4. In a warp twisting-in machine of the class described, the combination with a frame, of a slide vertically guided in said frame and having two parallel pins at right angles to it, means for reciprocating said slide, two opposite two-armed levers mounted on said two pins to rock in a common vertical plane, two inclined guides fastened in said frame and adapted to so guide the upper arms of said two-armed levers as to move together their lower arms in the upper position and to move them apart in the lower position of said slide, two pairs of tongs and two blades on the lower arms of said two-armed levers, each blade forming with one member of the pair of tongs a pair of scissors, and means for operating said tongs and said blades.

5. In a warp twisting-in machine of the class described, the combination with a frame, of a slide vertically guided in said frame and having two parallel pins at right angles to it, means for reciprocating said slide, two opposite two-armed levers mounted on said two pins to rock in a common vertical plane, two inclined guides fastened in said frame and adapted to so guide the upper arms of said two-armed levers as to move together their lower arms in the upper position and to move them apart in the lower position of said slide, two pairs of tongs on the lower arms of said two-armed levers and adapted to open and close in planes severally parallel to said two pins, springs for normally closing said tongs, two blades on said two pairs of tongs and each forming with one member of the pair of tongs a pair of scissors, two guiding levers on said frame and adapted to open said tongs against the tension of said springs during the motion of said slide and to release them in the lower position of the slide while at the same time they are adapted to open in one position and to close in the other position said two pairs of scissors, and means for reciprocating said two guiding levers.

6. In a warp twisting-in machine of the class described, the combination with a frame, of a slide vertically guided in said frame and having two parallel pins at right angles to it, means for reciprocating said slide, two opposite two-armed levers mounted on said two pins to rock in a common vertical plane, two inclined guides fastened in said frame and adapted to so guide the upper arms of said two-armed levers as to move together their lower arms in the upper position and to move them apart in the lower position of said slide, two pairs of tongs on the lower arms of said two-armed levers and adapted to open and close in planes severally parallel to said two pins, springs for normally closing said tongs, two blades on said two pairs of tongs and each forming with one member of the pair of tongs a pair of scissors, two pairs of two-armed operating levers on said two-armed levers and connected at their lower arms with the movable tongs members and the blades respectively, two guiding levers on said frame and adapted to open said tongs against the tension of said springs during the motion of said slide and to release them in the lower position of the slide while at the same time they are adapted to open in one position and to close in the other position said two pairs of scissors, and means for rocking said two guiding levers.

7. In a warp twisting-in machine of the class described, the combination with a frame, of a slide vertically guided in said frame and having two parallel pins at right angles to it, means for reciprocating said slide, two opposite two-armed levers mounted on said two pins to rock in a common vertical plane, two inclined guides fastened in said frame and adapted to so guide the upper arms of said two-armed levers as to move together their lower arms in the upper position and to move them apart in the lower position of said slide, two pairs of tongs on the lower arms of said two-armed levers and adapted to open and close in planes severally parallel to said two pins, springs for normally closing said tongs, two blades on said two pairs of tongs and each forming with one member of the pair of tongs a pair of scissors, two pairs of two-armed operating levers on said two two-armed levers and connected at their lower arms with the movable tongs members and the blades respectively, two guiding levers mounted on said frame to rock and each provided with a longitudinal slot terminating in a lateral mouth, and means for rocking said two guiding levers, so that in the lower position of said slide the mouths of the guiding levers in their one position permit the upper ends of the operating levers moving the blades to escape and to reënter in their other position, while during the motion of said slide the slots of the guiding levers move together the upper ends of the operating levers for forcibly opening said tongs.

8. In a warp twisting-in machine of the class described, the combination with clamps for holding the warp ends of two superposed leases, of means for separating the warp ends to be joined from the others, a frame, a shaft in said frame adapted to be driven from the machine, a cam disk fastened on said shaft, a vertical bar guided in said frame and adapted to be reciprocated by said cam disk, it terminating in a lower horizontal arm which is adapted to keep down the separated warp ends at their crossing point, means for gripping the separated warp ends near said clamps, means for cutting the gripped warp ends off from said clamps, two friction disks, and means for raising the cut gripped warp ends and introducing them between said two friction disks which are adapted to twist them.

9. In a warp twisting-in-machine of the class described, the combination with clamps for holding the warp ends of two superposed leases, means for maintaining the threads of each lease crossed, of two brushes adapted to separate the two warp ends to be joined from the others, means for keeping back the next following warp ends, which means operate alternately at the top and at the bottom of the cross of each lease, and means for operating said two brushes.

10. In a warp twisting-in machine of the class described, the combination with clamps for holding the warp ends of two superposed leases, of a frame, two brushes adapted to separate the two warp ends to be joined from the others, means in said frame for keeping back the next following warp ends, means in said frame for operating said brushes, two appliers so guided in said frame as to first lower and engage the warp ends held by said two brushes and then to move them out of the brushes, tongs adapted to receive the two warp ends from said two appliers, means for operating said two appliers, and means for operating said tongs.

11. In a warp twisting-in machine of the class described, the combination with a main carriage adapted to hold the warp ends of an old lease, of a subsidiary carriage movable on said main carriage across the warps and adapted to hold the warp ends of a new lease above the old lease, means for displacing said subsidiary carriage with regard to said main carriage, two standards on both sides of said main carriage, a frame above the two leases connecting said two standards, a twisting-in carriage guided in said frame and adapted to separate the two warp ends to be joined from the others, to grip them and cut them off said two carriages and to twist them together, and means for operating said twisting-in carriage.

12. In a warp twisting-in machine of the class described, the combination with a main carriage adapted to hold the warp ends of an old lease, of a subsidiary carriage movable on said main carriage across the warps and adapted to hold the warp ends of a new lease above the old lease, means for displacing said subsidiary carriage with regard to said main carriage, two standards on both sides of said main carriage, a frame above the two leases connecting said two standards, a twisting-in carriage guided in said frame, a feeler device in said twisting-in carriage adapted to bear against the then extreme warp end in the old lease, and a mechanism under the control of said feeler device for automatically feeding said twisting-in carriage.

13. In a warp twisting-in machine of the class described, the combination with a main carriage adapted to hold the warp ends of an old lease, of a subsidiary carriage movable on said main carriage across the warps and adapted to hold the warp ends of a new lease above the old lease, means for displacing said subsidiary carriage with regard to said main carriage, two standards on both sides of said main carriage, a frame above the two leases connecting said two standards, a twisting-in carriage guided in said frame, and a loaded indicator rocking in said twisting-in carriage and adapted to bear against the then extreme warp end in the new lease for indicating the relative position of the two extreme warp ends to be joined.

14. In a warp twisting-in machine of the class described, the combination with a main carriage adapted to hold the warp ends of an old lease, of a subsidiary carriage movable on said main carriage across the warps and adapted to hold the warp ends of a new lease above the old lease, means for displacing said subsidiary carriage with regard to said main carriage, two standards on both sides of said main carriage, a frame above the two leases connecting said two standards, a twisting-in carriage guided in said frame, a feeler device adapted to bear against the then extreme warp end in the old lease, means in said twisting-in carriage for constantly raising and lowering said feeler device and once for every pair of warp ends twisted-in, and a mechanism under the control of said feeler device for automatically feeding said twisting-in carriage.

15. In a warp twisting-in machine of the class described, the combination with means for holding the warp ends of an old lease, of means for holding the warp ends of a new lease above the old lease, a frame, a twisting-in carriage guided in said frame, a feeler device adapted to bear against the then extreme warp end in the old lease, means in said twisting-in carriage for constantly raising and lowering said feeler device and once for every pair of warp ends twisted-in, and a mechanism under the control of said feeler device for automatically feeding said twisting-in carriage.

16. In a warp twisting-in machine of the class described, the combination with means for holding the warp ends of an old lease, of means for holding the warp ends of a new lease above the old lease, a frame, a twisting-in carriage guided in said frame, a feeler device adapted to bear against the then extreme warp end in the old lease, means in said twisting-in carriage for constantly raising and lowering said feeler device and once for every pair of warp ends twisted-in, a mechanism in said frame for feeding said twisting-in carriage and comprising a ratchet wheel and a rocking arm with a pawl, and means under the control of said feeler device for automatically turning said pawl into and out of engagement with said ratchet wheel.

17. In a warp twisting-in machine of the class described, the combination with means for holding the warp ends of an old lease, of means for holding the warp ends of a new lease above the old lease, a frame, a twisting-in carriage guided in said frame, a hook guided in said twisting-in carriage, a feeler device adapted to bear against the then extreme warp end in the old lease and to engage said hook on the pressure of the warp end diminishing, means for constantly reciprocating said hook and constantly raising and lowering said feeler device and once for every pair of warp ends twisted-in, a mechanism in said frame for feeding said twisting-in carriage and comprising a ratchet wheel and a rocking arm with a pawl, and means under the control of said feeler device for automatically turning said pawl into and out of engagement with said ratchet wheel.

18. In a warp twisting-in machine of the class described, the combination with a main carriage adapted to receive the dividing bars, the shafts and the healds of an old lease, of clamps in said main carriage for holding the warp ends of the old lease, a subsidiary carriage movable on said main carriage across the warps and adapted to receive the dividing bars for a new lease, clamps in said subsidiary carriage for holding the warp ends of the new lease above the old lease, and means for displacing said subsidiary carriage with regard to said main carriage.

In testimony whereof I affix my signature in presence of two witnesses.

ADALBERT SCHUSTER. [L. S.]

Witnesses:
WM. WASHINGTON BRUNSWICK,
WILLIAM J. KONJETSUY.

Copies of this patent may be obtained for five cents each, by addressing the "Commissioner of Patents, Washington, D. C."